United States Patent [19]

Sacherman et al.

[11] Patent Number: 4,781,292

[45] Date of Patent: Nov. 1, 1988

[54] STORAGE RACK FOR COMPACT DISCS, CASSETTES AND THE LIKE

[76] Inventors: James E. Sacherman, 1550 California Ave., Palo Alto, Calif. 94306; John W. Toor, 425 Alma St., #311, Palo Alto, Calif. 94301

[21] Appl. No.: 10,217

[22] Filed: Feb. 3, 1987

Related U.S. Application Data

[63] Continuation-in-part of Ser. No. 848,452, Apr. 4, 1986, abandoned.

[51] Int. Cl.$^4$ .............................................. B65D 85/57
[52] U.S. Cl. .................................. 206/309; 206/425; 211/40
[58] Field of Search ........................ 206/307, 309–311, 206/387, 425, 444; 211/40, 41, 81, 169, 169.1, 170; 312/8–14

[56] References Cited

U.S. PATENT DOCUMENTS

| Re. 27,462 | 8/1972 | Gutierrez | 211/40 |
|---|---|---|---|
| 1,371,766 | 3/1921 | Johnson | 312/12 |
| 2,665,808 | 1/1954 | McAlister | 206/425 |
| 3,556,620 | 1/1971 | Gutierrez | 211/170 |
| 3,716,145 | 2/1973 | Gutierrez | 211/40 |
| 3,812,975 | 5/1974 | Gutierrez | 211/40 |
| 4,022,322 | 5/1977 | Louzil | 206/309 |

FOREIGN PATENT DOCUMENTS 0305344 2/1929 United Kingdom .................. 211/40

Primary Examiner—Jimmy G. Foster
Attorney, Agent, or Firm—James E. Eakin

[57] ABSTRACT

Apparatus capable of storing or displaying a plurality of compact discs, cassettes or other similar objects is disclosed. The apparatus includes a housing and a plurality of pivotable members rotatably positioned therein. Each pivotable member may hold one or more objects, each object being positioned within a compartment in the pivotable member. In one embodiment, each pivotable member includes a base plate, a rear wall, a pair of side walls, and a pair of members which together form a front wall. The front wall members cooperate with the rear wall, which may include clamping ribs, to provide a clamping force which substantially fixedly positions the compact discs within the pivotable member so that the display rack may be positioned throughout a range extending from substantially horizontal to substantially vertical. The clamping force may be adjusted by varying the dimensions and geometry of a slot associated with the clamping means.

6 Claims, 4 Drawing Sheets

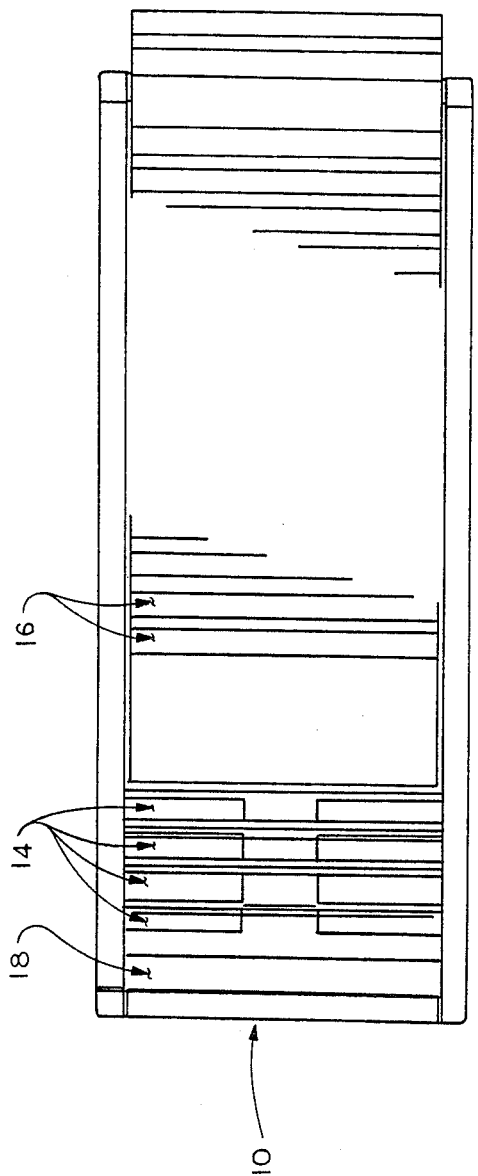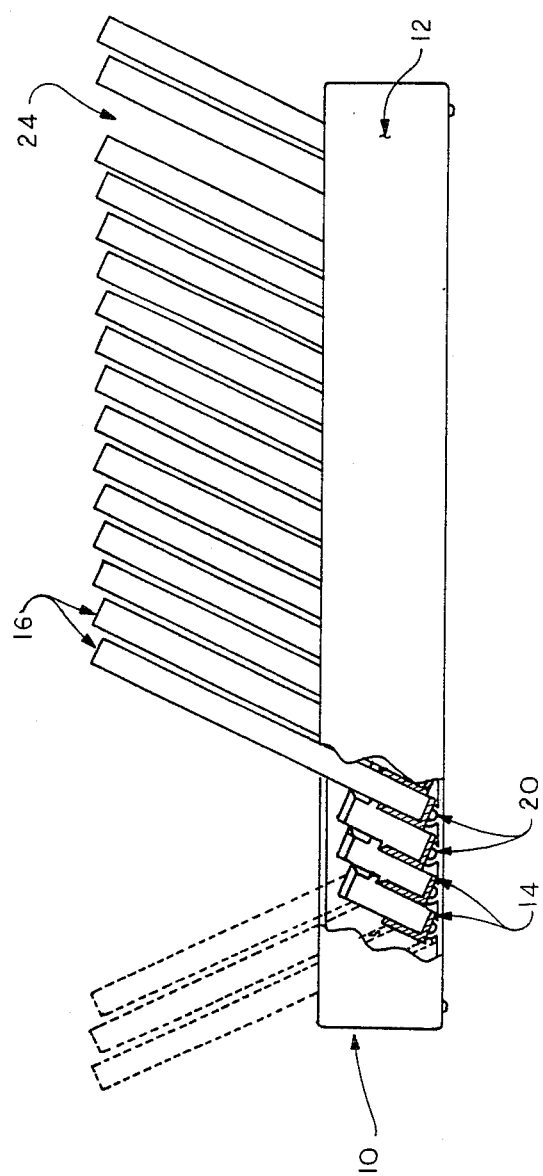

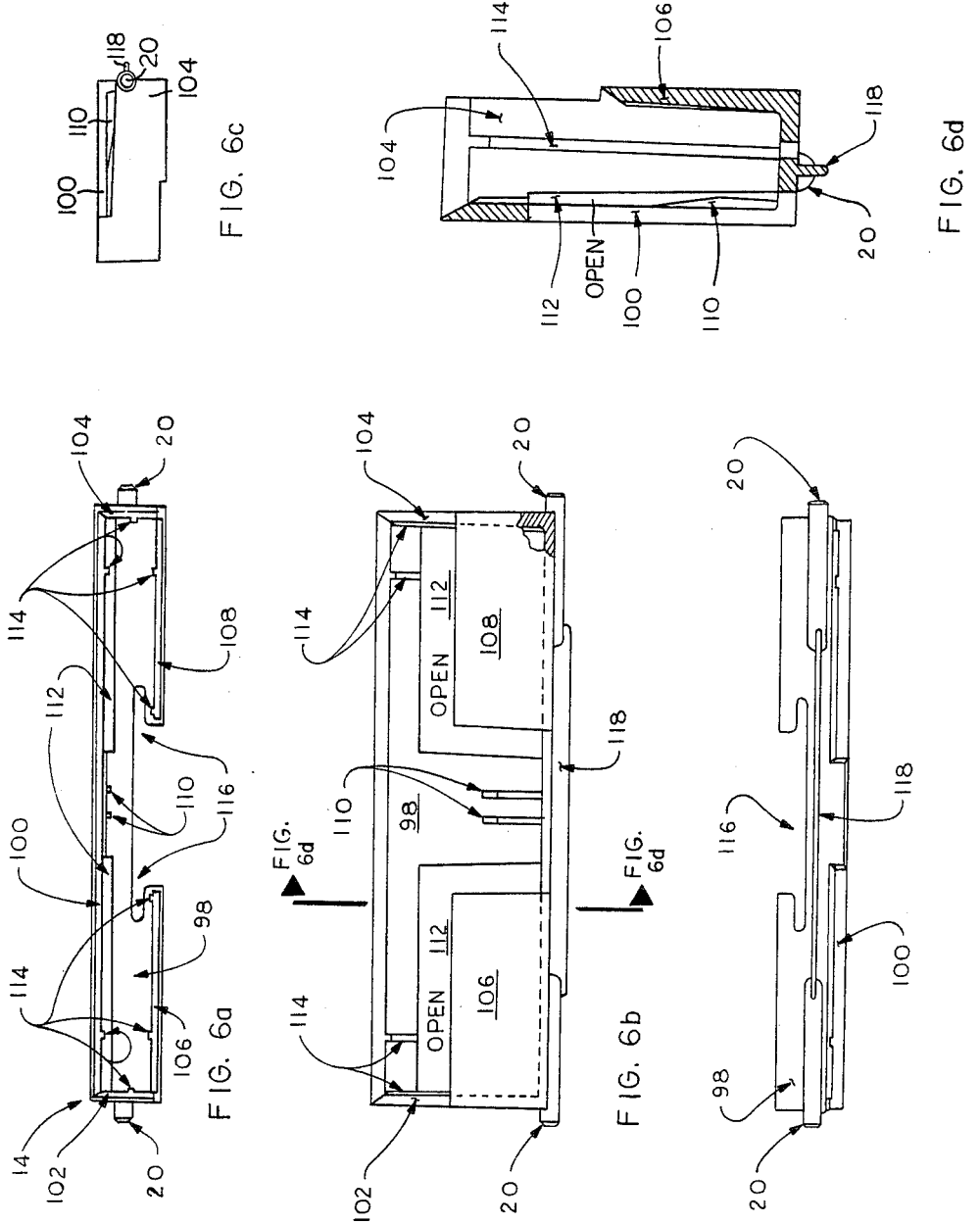

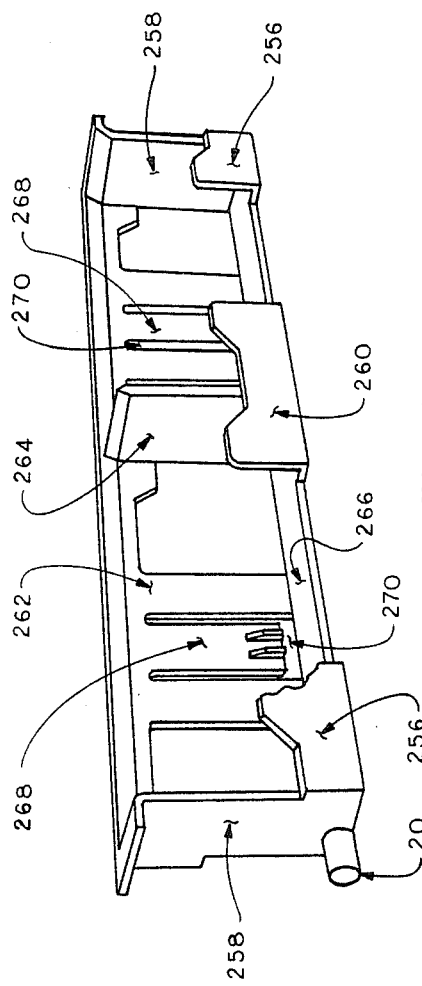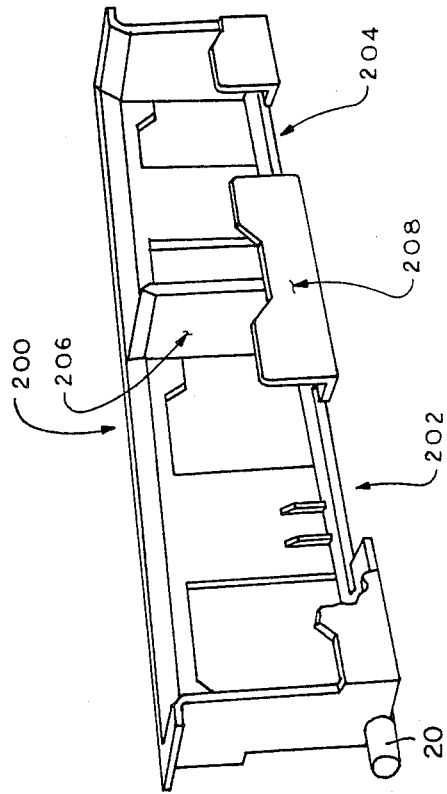

STORAGE RACK FOR COMPACT DISCS, CASSETTES AND THE LIKE

RELATED APPLICATIONS

This application is a continuation-in-part of U.S. patent application Ser. No. 848,452, filed Apr. 4, 1986, now abandoned.

FIELD OF THE INVENTION

This invention relates to a device for individually storing a plurality of compact discs, cassettes or other devices contained within their normal packages, and wherein those packages vary in width.

BACKGROUND OF THE INVENTION

Racks for storing various types of objects are well known in the art. Examples of such storage devices ranges from simple book racks consisting of a flat shelf to the self-actuating record jacket holders described in U.S. Pat. Nos. 3,446,360 and 3,712,477.

Racks for storing cardboard phonograph jackets have used a variety of techniques to achieve either simple storage, or a combination of storage and display. Virtually all, if not all, of these devices have required that the phonograph record being displayed be placed in a substantially vertical orientation to avoid undesired displacement of the record being stored or displayed. Examples of such display apparata include those disclosed in U.S. Pat. Nos. 3,889,812; 3,716,145; 3,897,871; 3,812,975; and 3,869,045.

While some of these devices have involved pivotable support members to allow a customer or user to thumb through the records, the pivot arrangements have in general been unduly complex while at the same time providing inefficient use of the available space and failing to adequately protect against mechanical damage to the displayed objects resulting from stress points caused by the supporting members or undesirable contact between the records themselves.

The concepts involved in the phonograph record display have in some instances been carried over to cassette tapes, as shown by U.S. Pat. No. 3,556,620. However, the storage device shown in the U.S. Pat. No. 3,556,620 again requires substantially a vertical storage position as well as suffering from other limitations. Moreover, none of the designs of the prior art have been adapted to provide for storage of compact audio discs.

In view of these and other limitations of the prior art, there has been a need for a storage and display rack capable of safely supporting a plurality of compact audio discs or other similar objects. In addition, there has been a need for a display rack capable of supporting such objects in a substantially horizontal orientation.

SUMMARY OF THE INVENTION

The storage and display apparatus of the present invention includes a housing containing therein a plurality of pivotable support members disposed adjacent one another so as to permit the maximum number of objects to be safely displayed. The pivotable members may be particularly adapted to the display of compact audio discs (contained within the manufacturer's individual plastic housings), although the present invention is also suited to storage of cassettes or other objects.

In one embodiment, each of the pivotable support members includes a pair of displaceable members for clamping the compact disc or other object within the support member in a manner which fixedly positions the compact discs. This permits the display apparatus to be positioned in a substantially horizontal position without causing the compact discs or other objects to be unintentionally displaced. Since the housings of such objects may vary slightly in thickness, the pair of displaceable members is configured to permit adequate clamping of a range of thicknesses of compact discs or other objects. The pivotable members may also be configured to hold more than one object, such as more than one compact disc, or more than one cassette.

In an alternative embodiment, the pivotable member may be configured to hold a plurality of compact discs or cassettes by means of displaceable spring members.

In addition, the pivotable support members are sized to permit the rotation of the displayed objects without permitting those objects to contact one another to an extent which may cause damage to them. Further, the smooth rotational action of the pivotable members permits a user to select any of the stored discs and move any adjacent interfering disks out of the way simply by rotation of the selected pivotable member.

It is one object of the present invention to provide an improved storage and display apparatus for compact discs or other substantially planar objects.

It is a further object of the present invention to provide a storage and display apparatus capable of pivotably positioning a plurality of compact discs or other objects substantially adjacent one another without permitting undesirable contact between them.

It is a still further object of the present invention to provide a storage and display apparatus capable of fixedly positioning the displayed objects in a manner adequate to permit a substantially horizontal display thereof.

These and other objects of the present invention may be appreciated from the following Detailed Description of the Invention, which may be better understood when read together with the appended drawings, in which FIG. 1 is a perspective view of an embodiment of the display and storage apparatus of the present invention designed to store a single object per pivotable member, and oriented to display objects vertically;

FIG. 2 is a top plan view (in the vertical orientation) of the display and storage apparatus shown in FIG. 1;

FIG. 3 is a side elevational view (in the vertical orientation) of the storage and display apparatus of the present invention as shown in FIG. 1;

FIG. 6a is a top plan view of the pivotable member of FIG. 5;

FIG. 6b is a front elevational view of the pivotable member of FIG. 5;

FIG. 6c is a side elevational view of the pivotable member of FIG. 5;

FIG. 6d is a cross-sectional side view of the pivotable member of FIG. 5 taken along the section lines shown in FIG. 6b;

FIG. 6e is a bottom plan view of the pivotable member of FIG. 5.

FIG. 7a is a perspective view of a second embodiment of the pivotable member of the present invention, wherein each pivotable member stores two objects; and FIG. 7b is a perspective view of a third embodiment of the pivotable member of the present invention, wherein each pivotable member stores two objects and each object is maintained within the pivotable member by means of a clamping member in the rear wall of the pivotable member.

DETAILED DESCRIPTION OF THE INVENTION

Figure 1:
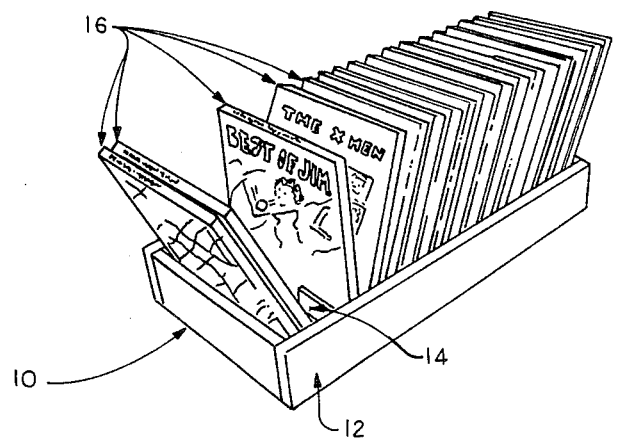

With reference now to FIGS. 1, 2 and 3, the general configuration of the storage and display apparatus 10 of the present invention can be appreciated. A housing 12 encloses a plurality of pivotable members 14, as may be clearly viewed from FIGS. 2 and 3. Compact discs or other objects 16 for display may be fixedly positioned within the pivotable members 14, with each pivotable member capable of positioning one disc or other object.

Although FIGS. 1-3 illustrate the display and storage apparatus 10 in an orientation which displays objects extending vertically from the apparatus, it will be appreciated that the apparatus 10 can simply be rotated up to, and in some instances slightly more than, 90 degrees through its longitudinal axis. This will permit the apparatus 10 to be oriented in a range between substantially vertical and substantially horizontal. When the apparatus 10 is oriented vertically, the objects 16 will extend horizontally therefrom. This may be seen by regarding FIG. 2 as a side elevational view, and FIG. 3 as a top plan view.

Figure 4:
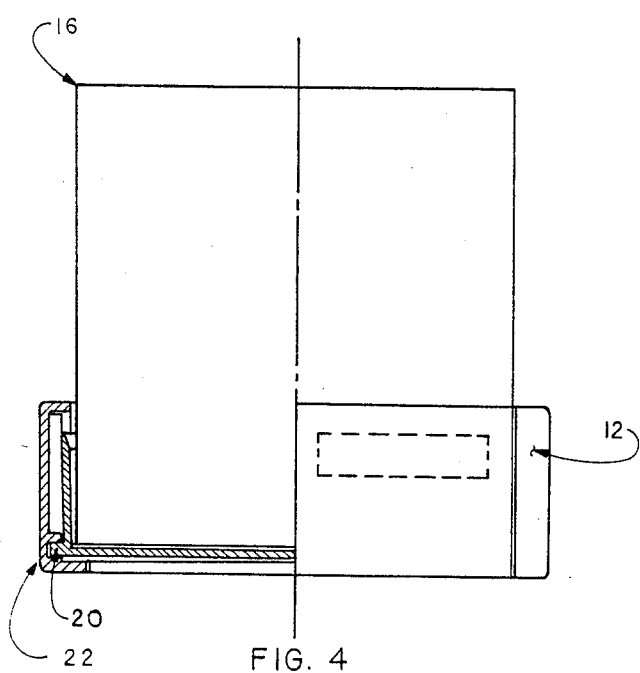
FIG. 4 is an end view of the storage and display apparatus of the present invention as shown in FIG. 1 with a portion thereof shown in cross-section.

With particular reference to FIG. 2, a storage area 18 may be provided for temporarily storing a housing for a compact disc during the period when the disc is being played. As seen from FIG. 2, and more clearly shown in the left cross-sectional portion of FIG. 4, the pivotable members 14 are positioned within the housing 12 by means of pins 20 (better seen in FIG. 5) which locate in a corresponding pair of receiving holes 22. The members 14 may thereby pivot about the pins 20, as best shown by the dotted lines in FIG. 3.

Referring particularly to FIG. 3, the pivotable members 14 may be seen in partial cross-sectional side view whereby a plurality of the members 14 can be seen to rest on and adjacent to other members 14. Because of the width of the member 14, it can be appreciated that a slight separation is maintained between the housing 16 substantially throughout the rotation of the pivotable members 14 throughout their range of movement. In addition, the pivotable members are arranged to that in nearly all cases a pivotable member contacts at least one adjacent member throughout the range of rotation, permitting the frictional force between adjacent members 14 to provide a damping action.

It may also be appreciated from FIG. 3, and particularly at the space 24 thereof, that the pivotable members 14 maintain the relative angle and position of the compact discs even when a selected disc and its housing are removed from the apparatus 10.

Figure 5:
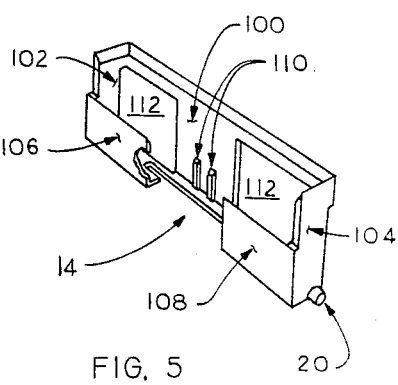
FIG. 5 is a perspective view of pivotable member of the storage and display apparatus of the present invention as shown in FIG. 1 with a portion thereof broken away.

Turning next to FIG. 5, the pivotable member 14 and its positioning pins 20 may be better appreciated. Each pivotable member 14 comprises a base plate 98, a rear wall 100, a pair of side walls 102 and 104, and a pair of members 106 and 108 which form a front wall. A pair of clamping ribs 110 are positioned on the back wall 100, which may for simplicity of molding or other reasons include a pair of open areas 112 that may extend into a portion of the side walls 102 and 104 and a portion of the base plate 98.

Referring next to FIGS. 6a-6d, the positioning and clamping features of the pivotable member 14 of the present invention may be better appreciated. The rear wall 100, side walls 102 and 104, members 106 and 108 and clamping ribs 110 may be chamfered for easy positioning of the compact disc housing. A plurality of positioning ribs 114 may be provided at various positions around the walls of the pivotable member 14 to permit the compact disc housing to be easily positioned in the member 14. The positioning ribs 114 may also be chamfered.

The clamping feature of the pivotable member 14 results from the cooperation of the front members 106 and 108 with the clamping ribs 110 and the rear wall 100. The insertion of a compact disk and its housing forces a slight displacement of the front members and the rear wall, causing a clamping force on the object being stored or displayed. Although in the present embodiment the clamping force results from displacement of both the front members and the rear wall, with the rear wall having the greater range of movement, those skilled in that art will recognize that displacement of both members is not required in all applications. Likewise, the side walls may be modified in accordance with the foregoing disclosure to provide the necessary clamping force.

The force required for displacement of the members 106 and 108 may be adjusted by the lengthening or shortening of the slot 116 in the base plate 98. The maximum thickness of disc housing which may be accomodated by the member 14 may be controlled by a combination of the distance between the clamping ribs 110 and the front members 106 and 108 together with the flexibility provided by the slot 116.

The pins 20 of the pivotable member 14 may be more clearly appreciated from FIG. 6e, which also shows the slot 116 in the base plate 98 from a reverse angle. The open areas 112 and some of the positioning ribs 114 may also be seen from a reverse angle. The positioning pins are joined by a reinforcing member 118.

With reference now FIG. 7a, there is shown therein an alternative embodiment of the pivotable member 14 shown in FIG. 5. More specifically, the pivotable member 200 shown therein comprises two compartments 202 and 204, each of which may store a compact disc, cassette or other suitable object. It may be readily seen that each compartment 202 and 204 is structurally equivalent in its essential respects to the pivotable member 14 discussed previously, except for the addition of a common wall 206 between the compartments 202 and 204 and the joinder of adjacent front members into a common front wall member 208. Of course, only one pair of pins 20 is required per pivotable member.

Reference is now made to FIG. 7b, which shows yet another embodiment of the pivotable member of the present invention. As with the pivotable member 200 of FIG. 7a, the pivotable member 250 of FIG. 7b comprises two compartments 252 and 254, each of which is capable of storing a compact disc, cassette or the like. Each compartment can be seen to include a front wall member 256 and a side wall member 258. The two compartments share a common front wall member 260, as well as a common rear wall 262, a common center wall 264, and a common bottom member 266. Each compartment includes one or more clamping members 268, which fixedly maintains the object between the clamping member 268 and the front wall members 256 and 260. The clamping force applied by the members 268 may be adjusted by various techniques, including lengthening the slot 270 surrounding each clamping member.

Having fully described one embodiment of the present invention, it will be appreciated by those skilled in the art given the teachings herein, that numerous alternatives and equivalents exist which do not depart from the present invention. As a result, the invention is to be limited only by the appended claims.

What is claimed is:

1. A storage and display apparatus for storing compact discs or the like comprising
    a housing having a plurality of spaced holes therein,
    a plurality of pivotable members pivotably positioned within the housing by means of pins capable of being received by the spaced holes in the housing,
    each pivotable member having a rear wall, a displaceable means opposite the rear wall for fixedly positioning a compact disc or the like between the rear wall and the displaceable means, and a base plate extending between the bottom of the rear wall and the bottom of the displaceable means having a slot therein for adjusting the range of displacement of the displaceable means.

2. The invention of claim 1 further including clamping ribs in the rear wall for assisting in fixedly positioning the compact disc or the like.

3. The invention of claim 2 wherein contiguous pivotable members maintain substantially continuous contact to provide a damping force during movement of the pivotable members.

4. A storage and display apparatus for compact disks and the like comprising
    a housing having a plurality of positioning holes therein
    a plurality of members pivotably positioned within the housing by means of pins capable of being received by the positioning holes in the housing,
    each pivotable member having at least a pair of opposed surfaces capable of relative displacement for clamping a compact disk or the like therebetween, the opposed surfaces being connected by a base plate and the base plate having a slot therein for adjusting the range of relative displacement of opposed surfaces.

5. The invention of claim 4 wherein contiguous pivotable members maintain substantially continuous contact to provide a damping force during movement of the pivotable members.

6. A storage and display apparatus for storing compact discs or the like comprising
    a housing having a plurality of spaced holes therein,
    a plurality of pivotable members having pins capable of being received by the holes in the housing and further at least two compartments therein, each such compartment having at least one clamping means for generating a clamping force and including at least one displaceable member, a wall opposed thereto, and a bottom member extending therebetween for fixedly positioning a compact disc or the like between the at least one displaceable member and the opposing wall of the clamping means, the clamping force generated by the clamping means being adjustable by varying the dimensions of a slot associated with the clamping means, the slot for adjusting the clamping force being in the bottom member of the pivotable member.

* * * * *